United States Patent
Kang et al.

(10) Patent No.: US 7,178,257 B2
(45) Date of Patent: Feb. 20, 2007

(54) TAPE MEASURE WITH AUTOMATIC BLADE EXTENSION MECHANISM

(75) Inventors: Dong Hun Kang, Busan (KR); Young Joon Choi, Oakland, NJ (US)

(73) Assignee: Komelon Corporation, Busan (KR)

( * ) Notice: Subject to any disclaimer, the term of this patent is extended or adjusted under 35 U.S.C. 154(b) by 0 days.

(21) Appl. No.: 11/174,561

(22) Filed: Jul. 6, 2005

(65) Prior Publication Data
US 2006/0096113 A1  May 11, 2006

(30) Foreign Application Priority Data
Nov. 10, 2004  (KR) ...................... 10-2004-0091185

(51) Int. Cl.
*G01B 3/10* (2006.01)
(52) U.S. Cl. ........................................................ 33/761
(58) Field of Classification Search ................. 33/755, 33/759, 761, 762, 763, 767, 769; 242/350, 242/354.2, 379
See application file for complete search history.

(56) References Cited

U.S. PATENT DOCUMENTS

| | | | | |
|---|---|---|---|---|
| 3,675,334 A | * | 7/1972 | Quenot ......................... 33/767 |
| 4,449,302 A | * | 5/1984 | Drechsler et al. .............. 33/767 |
| 4,649,649 A | * | 3/1987 | Fain .............................. 33/761 |
| 4,927,092 A | * | 5/1990 | Ingram et al. ............ 242/381.3 |
| 5,448,837 A | * | 9/1995 | Han-Teng ...................... 33/761 |
| 5,768,797 A | | 6/1998 | Trevino ......................... 33/761 |
| 5,875,987 A | * | 3/1999 | Pullen ......................... 242/379 |
| 6,491,248 B1 | * | 12/2002 | Liu .......................... 242/381.3 |
| 6,595,451 B1 | | 7/2003 | Kang et al. .............. 242/381.2 |
| 7,040,035 B1 | * | 5/2006 | Scarborough ................ 33/668 |

FOREIGN PATENT DOCUMENTS

JP  63-256802  10/1988
JP  10-281704  10/1998

* cited by examiner

*Primary Examiner*—R. Alexander Smith
(74) *Attorney, Agent, or Firm*—Wenderoth, Lind & Ponack, L.L.P.

(57) ABSTRACT

A tape measure includes an automatic blade extension mechanism. The tape measure allows a user to draw and lock a blade using only one hand, when measuring a dimension of an object, thus allowing the other hand to be freely used in a workplace where several operations must be carried out. Therefore, the tape measure allows the user to simultaneously perform a cutting operation, a hammering operation, a marking operation, etc. during the measuring operation. Thereby, the tape measure of this invention is convenient to use, and increases work efficiency.

2 Claims, 5 Drawing Sheets

TAPE MEASURE WITH AUTOMATIC BLADE EXTENSION MECHANISM

BACKGROUND OF THE INVENTION

1. Field of the Invention

The present invention relates to a tape measure with an automatic blade extension mechanism.

2. Description of the Related Art

Generally, a tape measure includes a bobbin which is elastically supported in a housing. A blade is provided in the housing while being wound around the bobbin in a coil form. An end hook coupled to an end of the blade is exposed to the outside of a slot that is formed at a lower position on a surface of the housing. Thereby, as the end hook is pulled out, the blade is extended from the housing. Meanwhile, when the end hook is released, the blade is retracted into the housing due to the elasticity of a spring.

Further, a certain type of tape measure is provided with a locking means. The locking means functions to prevent the blade from being retracted into the housing due to the tension of the spring, even if the blade is pulled out of the housing and a pulling force applied to the end hook provided at the end of the blade is discontinued.

A tape measure having such a blade locking means is disclosed in Korean Patent Laid-Open Publication No. 2003-0065290, which was filed by the applicant of this invention and is titled "tape locking device for tape measures". The document is incorporated into the present invention.

According to this document, the tape locking device includes a locking lever which is hinged to an upper end of a housing. A coupling piece extends downwards from the locking lever, and a cylinder wound with a coil spring is coupled to an end of the coupling piece. Further, a wedged stopper is mounted to an end of the cylinder to impart a high frictional force. The stopper is elastically inserted between an outer circumference of a tape wound around a bobbin and a linear tape pulled out through a slot, so that the extended tape is automatically stopped, due to friction between the surface of the stopper and the surface of the extended tape.

Meanwhile, a conventional tape measure is configured so that a user measures the dimension of a desired object using both hands. Thus, when it is impossible to use both hands, for example, when the user is holding a tool in one hand, the user cannot measure the object using the tape measure. In order to solve the problem, a tape measure capable of being used to measure a dimension of an object using one hand has been proposed in U.S. Pat. No. 5,875,987, which is titled 'power operated tape measure'. According to the patent, the tape measure includes a casing having a battery chamber and a circular chamber. A motor is installed in the casing and is provided with an output shaft. A first switch is mounted on the casing and is electrically connected to the battery chamber of the casing to control the motor. An annular reel is fitted within the circular chamber. Further, a spring-biased tape is wound around the reel. A driving wheel is fixedly mounted on the output shaft of the motor to directly engage with the surface of the tape and thereby push the tape out of the casing. A rod is connected to the driving wheel. Further, a second switch is mounted on the casing and connected to the rod. The second switch disengages the driving wheel from the tape surface so as to allow the tape to be taken up.

The term "tape" used in the patent refers to the same part as the term "blade". Generally, the term "tape" is used interchangeably with the term "blade".

Meanwhile, the conventional tape measure is problematic in that the motor and other components are installed in the tape measure, so that the tape measure is heavy, thus it is inconvenient to use. Further, since the components are complex, manufacturing costs of the tape measure are high.

Moreover, since the motor is operated using the battery, the tape may sag due to the weight of the tape, when the tape is pulled out from the casing about 6 feet or more. In this case, the tape comes into contact with a lower edge of the slot, thus generating frictional force. Due to the frictional force, the tape extension speed is considerably reduced, and the motor has difficulty in extending the tape from the casing.

Further, when the tape is lengthily extended from the casing, the tape comes into contact with the lower edge of the slot, thus generating the frictional force. Due to the frictional force, the tape is not easily retracted into the casing when taken up.

SUMMARY OF THE INVENTION

Accordingly, the present invention has been made keeping in mind the above problems occurring in the prior art, and an object of the present invention is to provide a tape measure with an automatic blade extension mechanism, with which a blade may be pulled and locked using one hand when measuring a dimension of a desired object, thus allowing the other hand to be freely used in a workplace where several works are carried out, therefore allowing several works including cutting work, hammering work, marking work, etc. to be simultaneously executed during the measuring operation. The tape measure is convenient to use, in addition to increasing working efficiency. Further, the tape measure allows the other hand to be freely used, thus ensuring safety. The tape measure allows a user to easily measure the length of a desired object, even in a narrow space where it is difficult to use both hands.

In order to accomplish the above object, the present invention provides a tape measure with an automatic blade extension mechanism, including a housing having on a lower end of a surface thereof a slot, a bobbin rotatably installed in the housing, and a blade wound around the bobbin in a coil and extended out through the slot. The tape measure includes a ground contact roller rotatably provided in a lower portion of the housing to be in contact with a flat exterior surface, wherein the ground contact roller is rolled on the flat exterior surface to rotate, and the blade is extended from the housing, due to the rotation of the ground contact roller.

Of course, the ground contact roller may comprise a plurality of ground contact rollers.

Preferably, the ground contact roller is provided under the blade to extend the blade from the housing, and a support unit is provided above the blade to support the blade.

According to an aspect of the invention, the tape measure further includes a first power transmission unit which is provided between the ground contact roller and the blade, and transmits a rotating force from the ground contact roller to the blade.

In another aspect of this embodiment, the ground contact roller provides a rotating force to the bobbin, and a second power transmission unit is provided between the ground contact roller and the bobbin to transmit a rotating force from the ground contact roller to the bobbin.

In yet another aspect of this embodiment, the tape measure further includes a blade locking unit to lock the blade extended from the housing.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The preferred embodiments of this invention will be described in detail with reference to the accompanying drawings. The elements common to both the prior art and this invention will be described with reference to the prior art.

Figure 1:
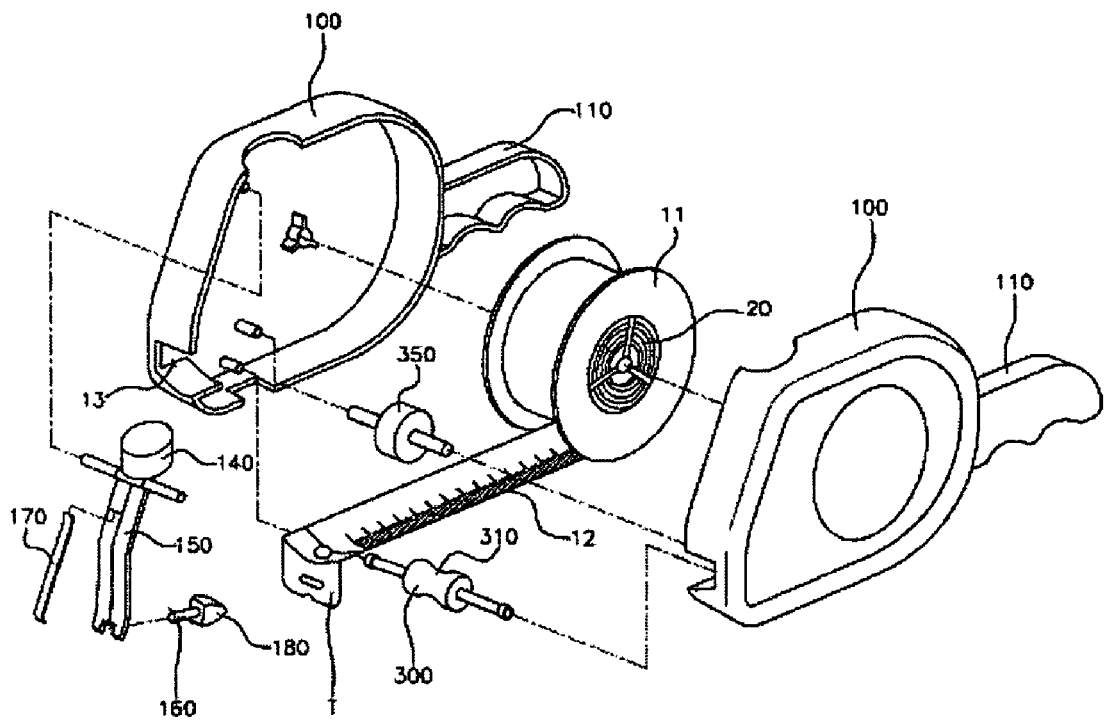
FIG. 1 is an exploded perspective view of a tape measure with an automatic blade extension mechanism, according to the first embodiment of the present invention.
Figure 2:
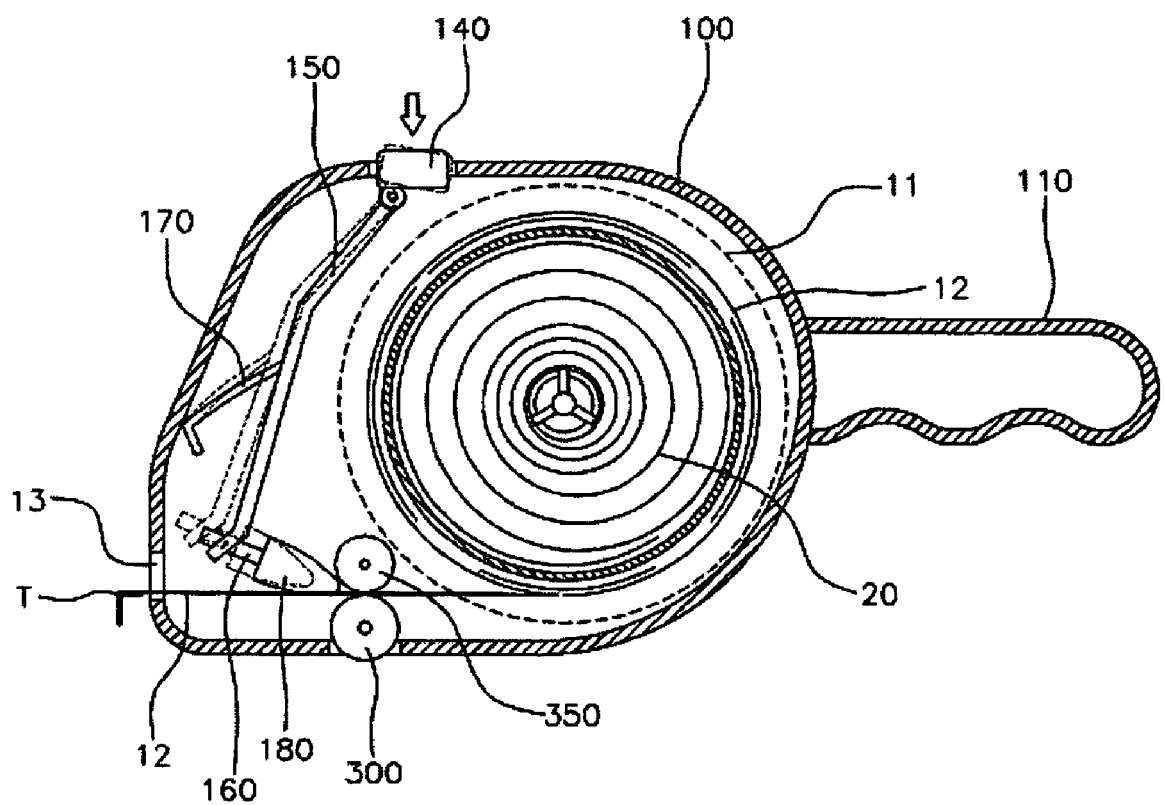
FIG. 2 is a sectional view of the tape measure of FIG. 1.

FIG. 1 is an exploded perspective view of a tape measure with an automatic blade extension mechanism, according to the first embodiment of the present invention, and FIG. 2 is a sectional view of the tape measure of FIG. 1.

As shown in FIGS. 1 and 2, the tape measure with the automatic blade extension mechanism, according to the first embodiment of the present invention, includes a housing 100. A slot 13 is formed at a lower position on a surface of the housing 100. A bobbin 11 is rotatably installed in the housing 100. Further, a blade 12 is wound around the bobbin 11 in a coil, and is pulled out through the slot 13.

A plate spring 20 is provided in the bobbin 11 and wound in a coil while an end of the plate spring 20 is secured to a rotating shaft. When the blade 12 which is wound around the bobbin 11 is pulled and released, the blade 12 is automatically wound around the bobbin 11 by the elastic force of the plate spring 20.

Further, a handle 110 is provided on an outer surface of the housing 100 so that a user may easily grasp the tape measure.

At least one ground contact roller 300 is rotatably provided under the portion of the blade 12 that is positioned in a lower portion of the housing 100. Part of the ground contact roller 300 is exposed to the outside of the housing 100 so as to be in contact with a flat exterior surface.

In order to prevent the blade 12 from being bent during the extension of the blade 12, the blade 12 is drawn out from the housing 100 while keeping the central portion of the blade 12 concave. Thus, it is preferable that the ground contact roller 300 be narrow in the middle to provide a constriction 310 corresponding to the concave central portion of the blade 12. The constriction 310 reduces the area of the ground contact roller 300 contacting the exterior surface, thus preventing the ground contact roller 300 from easily becoming contaminated with dust or the like, and preventing the ground contact roller 300 from slipping.

Further, the ground contact roller 300 may be made of a hard or soft material, as desired. For example, when the surface contacting the ground contact roller 300 is relatively hard, like glass or wood, it is preferable that the ground contact roller 300 be made of a soft material, such as rubber having elasticity. Conversely, when the surface contacting the ground contact roller 300 is relatively soft, like a carpet, it is preferable that the ground contact roller 300 be made of a hard material, such as metal. The ground contact roller 300 is located under the blade 12 and is in contact with the blade 12, whereas a cylindrical support unit 350 provided in the housing 100 is located above the blade 12 to support the blade 12. In this case, the support unit 350 may be rotatably installed in the housing 100, like the ground contact roller 300. However, without being limited to such a construction, the support unit 350 may be fixed to the housing 100. The support unit 350 is located at a position corresponding to the ground contact roller 300 which is provided under the blade 12. Thereby, the blade 12 is pulled out of the housing 100, using the rotating force of the ground contact roller 300 and the force of the support unit 350 to support the blade 12.

Figure 3:
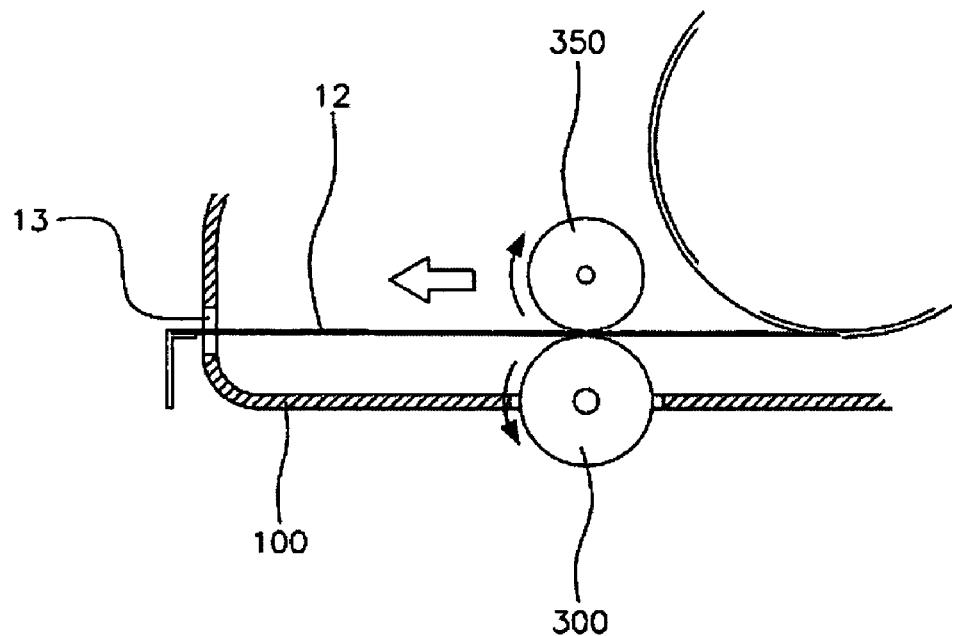
FIG. 3 is a sectional view to schematically show the operation of a ground contact roller and a support unit of FIG. 2.

In a detailed description, as shown in FIG. 3, when the housing 100 is moved forwards such that the ground contact roller 300 rotates in the counterclockwise direction of FIG. 3, the ground contact roller 300 rotates in the counterclockwise direction, and the support unit 350 rotates in the clockwise direction of FIG. 3. Thereby, the blade 12 is extended from the housing 100 through the slot 13, after passing through a gap between the ground contact roller 300 and the support unit 350.

Figure 4:
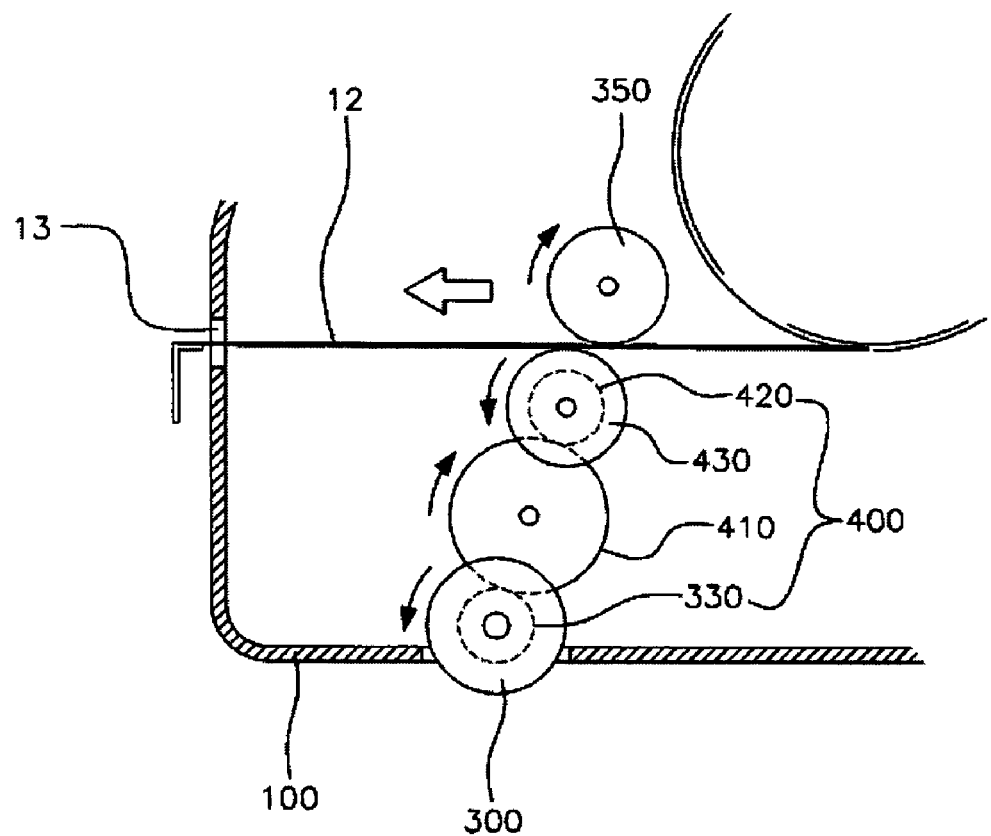
FIG. 4 is a sectional view of a tape measure with an automatic blade extension mechanism, according to the second embodiment of the present invention.

The counterclockwise direction and the clockwise direction that were described above denote the counterclockwise direction and the clockwise direction shown in the attached drawings, and a clockwise direction and a counterclockwise direction that will be described below denote the clockwise direction and the counterclockwise direction shown in the attached drawings. According to the first embodiment that has been described above, the ground contact roller 300 is in contact with the underside of the blade 12, so that rotating force is directly transmitted from the ground contact roller 300 to the blade 12. Meanwhile, according to the second embodiment of this invention, as shown in FIG. 4, a first power transmission unit 400 may be provided between the ground contact roller 300 and the blade 12 to transmit a rotating force from the ground contact roller 300 to the blade 12. The first power transmission unit 400 includes a first gear 330, a second gear 410, a third gear 420, and a blade contact roller 430. The first gear 330 is coupled to a rotating shaft of the ground contact roller 300. The second gear 410 engages with the first gear 330. The third gear 420 engages with the second gear 410. Further, the blade contact roller 430 is coupled to a rotating shaft of the third gear 420, and is in contact with the underside of the blade 12. That is, when the housing 100 is moved forwards so that the ground contact roller 300 rotates in the counterclockwise direction, the ground contact roller 300 and the first gear 330 rotate in the counterclockwise direction. The second gear 410 engaging with the first gear 330 rotates in the clockwise direction. The third gear 420, engaging with the second gear 410, and the blade contact roller 430 rotate in the counterclockwise direction. The support unit 350 contacting the upper surface of the blade 12 rotates in the clockwise direction. Thereby, the blade 12 provided between the blade contact roller 430 and the support unit 350 is extended from the housing 100 through the slot 13.

Further, it is possible to extend the blade 12 from the housing 100, even when the housing 100 is moved backwards, by appropriately adjusting the gear number of the first power transmission unit 400. The first power transmission unit 400 of this embodiment may be variously changed.

Figure 6:
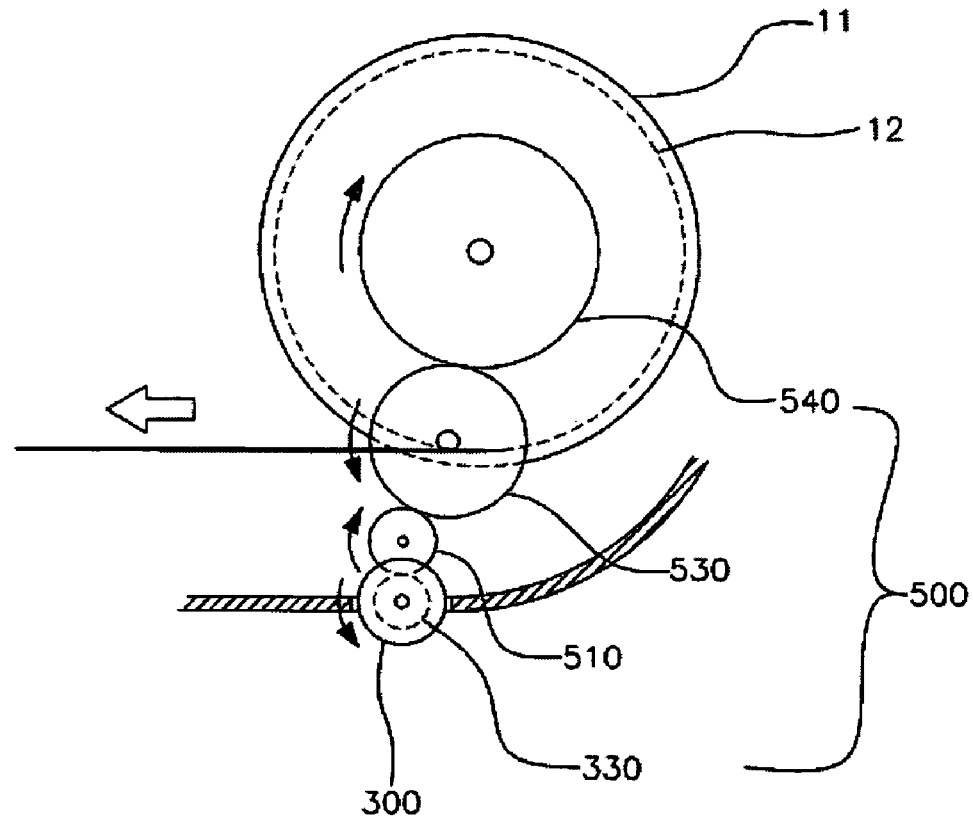
FIG. 6 is a sectional view to show a tape measure with an automatic blade extension mechanism, according to the third embodiment of the present invention.

A tape measure with an automatic blade extension mechanism, according to the third embodiment of the present invention, includes a second power transmission unit 500 between the ground contact roller 300 and the bobbin 11, as shown in FIG. 6. Those elements common to both the first embodiment and the third embodiment will not be described below, but only particular elements of the third embodiment will be described. The second power transmission unit 500 includes a first gear 330 coupled to a rotating shaft of the ground contact roller 300, a fourth gear 510 engaging with the first gear 330, a fifth gear 530 engaging with the fourth gear 510, and a driven gear 540 which engages with the fifth gear 530 and is coupled to a rotating shaft of the bobbin 11. In the tape measure constructed in this way, when the housing 100 is moved forwards so that the ground contact roller 300 is rotated in the counterclockwise direction, the ground contact roller 300 and the first gear 330 are rotated in the counterclockwise direction, and the fourth gear 510, engaging with the first gear 330, is rotated in the clockwise direction. Further, the fifth gear 530, engaging with the fourth gear 510, is rotated in the counterclockwise direction, and the driven gear 540, engaging with the fifth gear 530, and the bobbin 11 are rotated in the clockwise direction. Thereby, the blade 12 is extended from the housing 100.

Like the first power transmission unit 500 of the second embodiment, it is possible to extend the blade 12 from the housing 100, even when the housing 100 is moved backwards, by appropriately adjusting the gear number of the second power transmission unit 500. The second power transmission unit 500 of this embodiment may be variously changed.

Preferably, a blade locking unit is provided at a predetermined position on the housing 100 to lock the extended blade 12.

An earlier patent disclosure dealing with the blade locking unit of this invention is found in Korean Laid-Open Publication No. 2003-0065290 which was filed by the inventor of this invention. The publication is incorporated into this invention. The construction of the blade locking unit common to both this invention and the prior art will not be described in detail herein.

The blade locking unit includes a locking lever and a compression piece. The locking lever is mounted to a predetermined position on an upper portion of the housing 100. The compression piece is coupled to the locking lever and vertically moves along the locking lever. When the locking lever is moved downwards, the compression piece is in close contact with the linear portion of the blade 12, which is drawn out through the slot 13, thus locking the blade 12 (see, said Laid-Open Publication).

Figure 5:
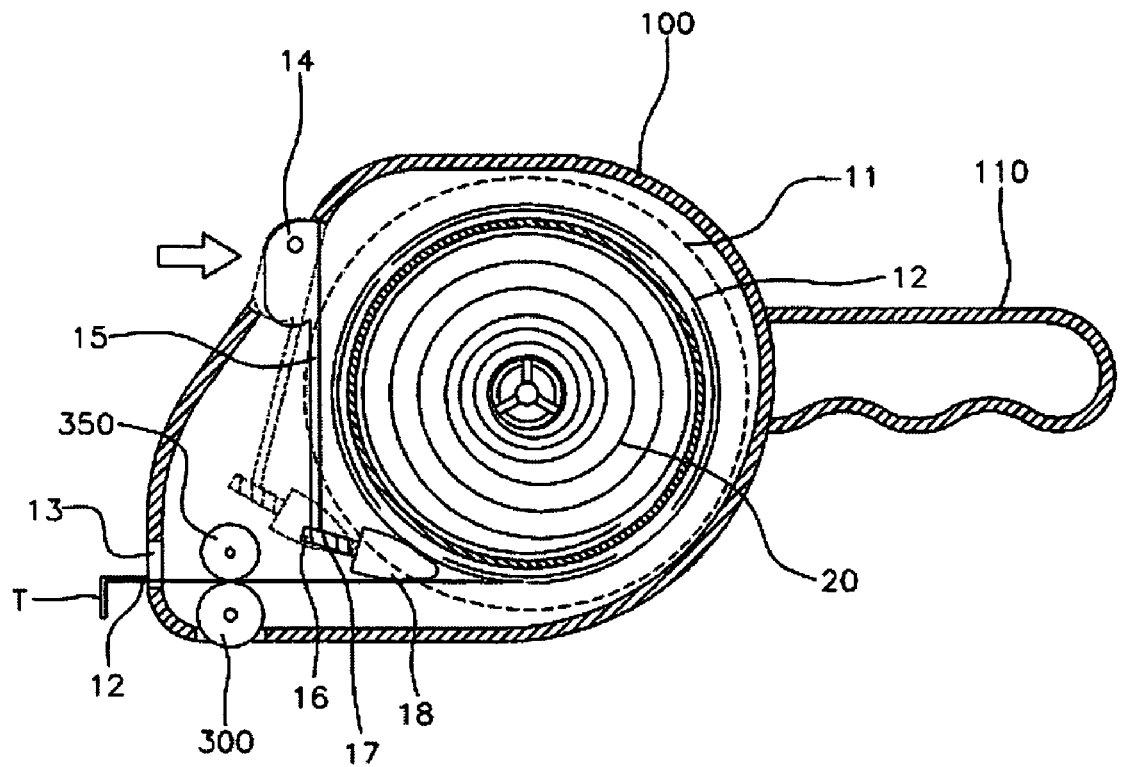
FIG. 5 is a sectional view of a blade locking unit, according to a modification of the present invention.

FIG. 5 shows a blade locking unit, according to a modification of this invention. The blade locking unit includes a locking lever 14, a cylinder 16, and a stopper 18. The locking lever 14 is hinged to a predetermined position on the upper portion of the housing 100, with a coupling piece 15 extending downwards from the locking lever 14. The cylinder 16 is mounted to an end of the coupling piece 15, with a coil spring 17 fitted over the cylinder 16. Further, the wedged stopper 18 is mounted to an end of the cylinder 16.

Since the stopper 18 is elastically inserted between the outer surface of the blade 12 wrapped around the bobbin 11 and the linear portion of the blade 12 drawn out through the slot 13, the extended blade 12 is automatically stopped, due to friction between the surface of the stopper 18 and the surface of the extended blade 12.

Another blade locking unit is shown in FIG. 2. The blade locking unit includes the locking lever 140, the cylinder 160, and the stopper 180, like the blade locking unit of FIG. 5. The locking lever 140, the cylinder 160, and the stopper 180 are the same as those of FIG. 5, except that the stopper 180 is elastically inserted between the support unit 350 and the linear portion of the blade 12 which is drawn out through the slot 13. In this case, the blade locking unit may be constructed so that the cylinder 16, surrounded by the coil spring 17, is mounted to an end of the coupling piece 15, and the stopper 18 is mounted to an end of the cylinder 16, as shown in FIG. 5. However, as shown in FIG. 2, the blade locking unit may be constructed so that a plate spring 170 is secured to the coupling piece 150 and is supported by the housing 100.

The blade locking unit of FIG. 2 may be applied to the tape measure having the support unit 350. That is, it is difficult to apply the blade locking unit of FIG. 2 to a tape measure constructed to rotate the bobbin 11, like the second embodiment.

Figure 7:
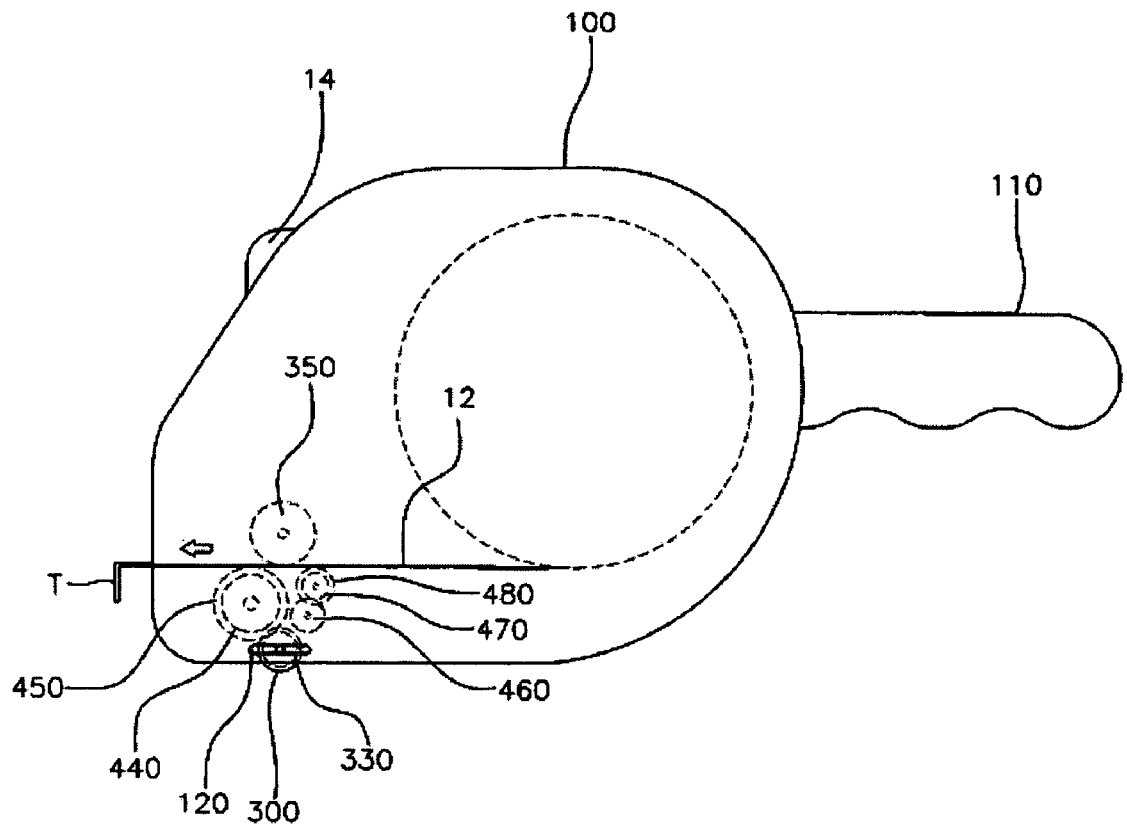
FIG. 7 is a sectional view to schematically show a tape measure with an automatic blade extension mechanism, according to the fourth embodiment of the present invention.

FIG. 7 shows a tape measure with an automatic blade extension mechanism, according to the fourth embodiment of the present invention. As shown in the drawing, a slot 120 is provided on a side surface of a housing 100 such that a rotating shaft of a ground contact roller 300 moves forwards and backwards. The tape measure is provided with a first power transmission unit. The first power transmission unit transmits the rotating force of the ground contact roller 300 to extend the blade 12 from the housing 100, when the rotating shaft of the ground contact roller 300 reaches the front or rear edge of the slot 120.

The fourth embodiment of this invention is similar to the second embodiment in that the first power transmission unit 400 is provided between the ground contact roller 300 and the blade 12 to transmit the rotating force from the ground contact roller 300 to the blade 12. The first power transmission unit according to the fourth embodiment includes a first gear 330, a sixth gear 440, a front blade contact roller 450, a seventh gear 460, an eighth gear 470, and a rear blade contact roller 480. The first gear 330 is coupled to the rotating shaft of the ground contact roller 300. The sixth gear 440 engages with the first gear 330, when the rotating shaft of the ground contact roller 300 is located at the front edge of the slot 120. The front blade contact roller 450 is coupled to a rotating shaft of the sixth gear 440, and is in contact with the underside of the blade 12. The seventh gear 460 engages with the first gear 330, when the rotating shaft of the ground contact roller 300 is located at the rear edge of the slot 120. The eighth gear 470 engages with the seventh gear 460. Further, the rear blade contact roller 480 is coupled to a rotating shaft of the eighth gear 470, and is in contact with the underside of the blade 12.

Figure 8A:
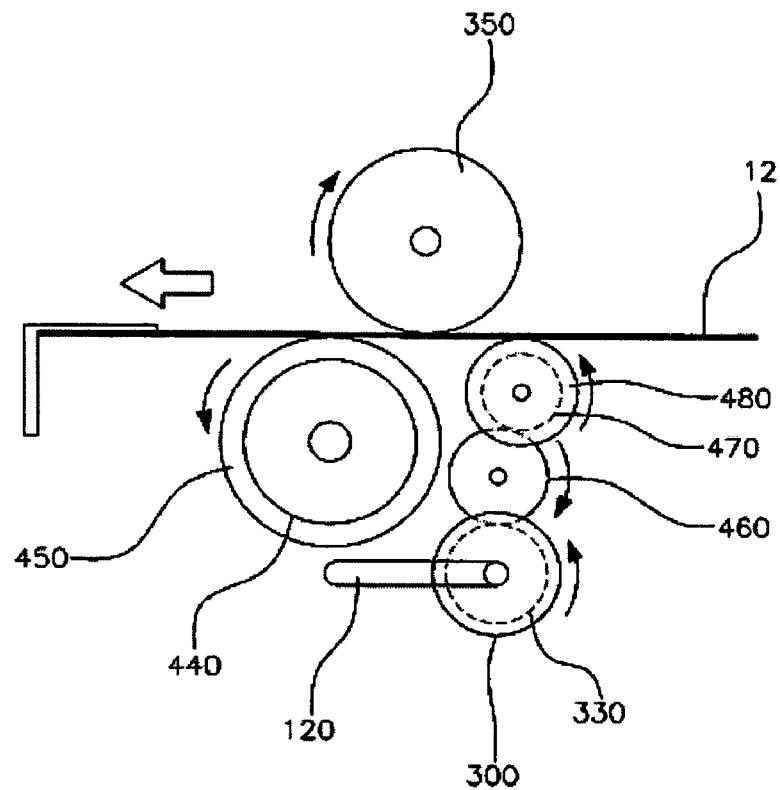
FIGS. 8a and 8b are schematic views to show the operation of a ground contact roller and a support unit of FIG. 7.

When the ground contact roller 300 comes into contact with an exterior surface and the housing 100 is moved forwards, as shown in FIG. 8a, the rotating shaft of the ground contact roller 300 moves to the rear edge of the slot 120. Thus, the ground contact roller 300 and the first gear 330 are rotated in the counterclockwise direction, so that the seventh gear 460 engaging with the first gear 330 is rotated in the clockwise direction, and the eighth gear 470 engaging with the seventh gear 460 and the rear blade contact roller 480 are rotated in the counterclockwise direction. Thereby, the blade 12 is extended from the housing 100, due to the rotating force of the rear blade contact roller 480 and the force of the support unit 350 to support the blade 12. At this time, the front blade contact roller 450 and the sixth gear 440 that are provided at the front of the tape measure are rotated in the counterclockwise direction, due to the force generated by the extended blade 12.

Figure 8B:
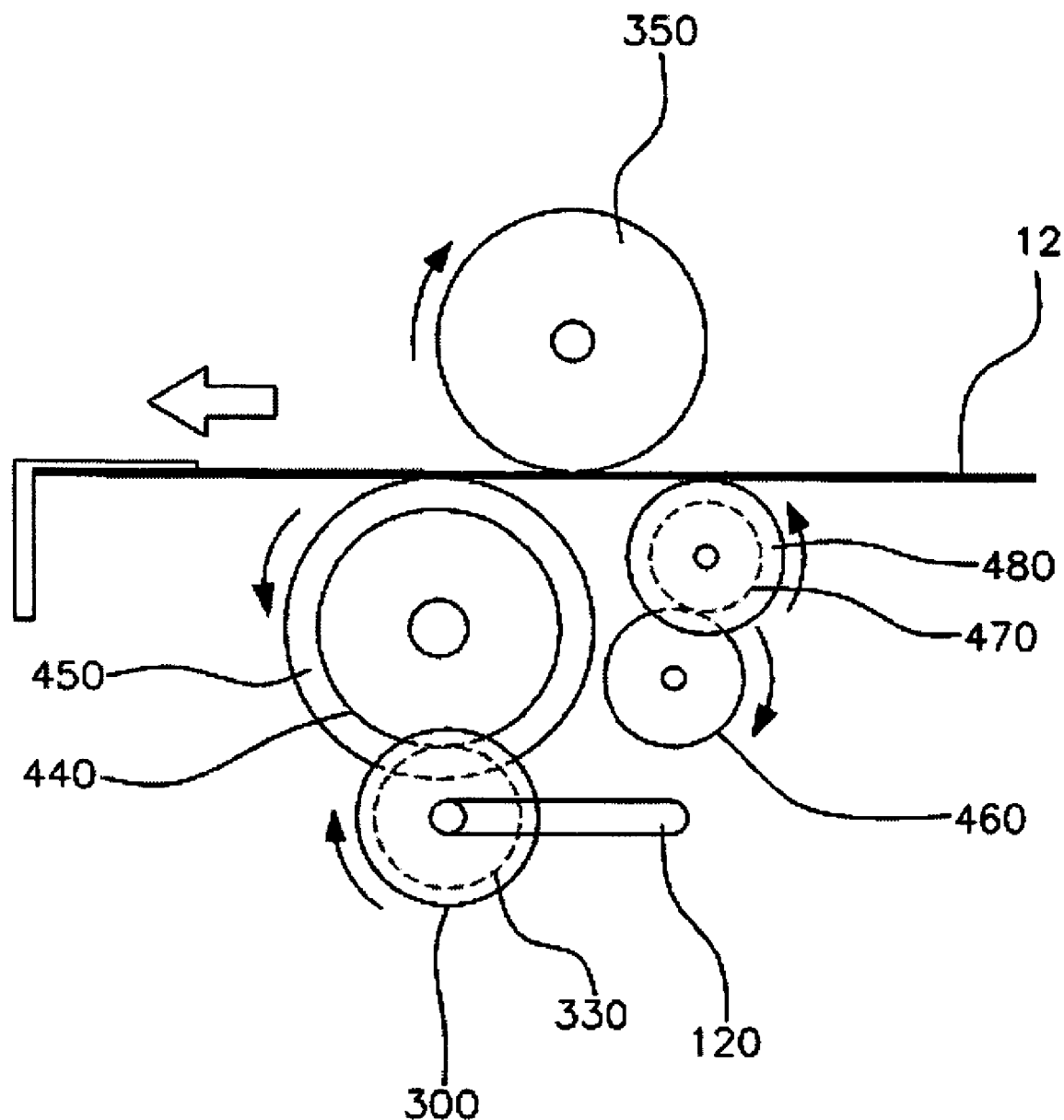

Conversely, when the ground contact roller 300 is in contact with the exterior surface and then the housing 100 is moved rearwards, as shown in FIG. 8b, the rotating shaft of the ground contact roller 300 is moved to the front edge of the slot 120, so that the ground contact roller 300 and the first gear 330 are rotated in the clockwise direction. Thereby, the sixth gear 440 engaging with the first gear 330 and the front blade contact roller 450 are rotated in the counterclockwise direction, so that the blade 12 is extended from the housing 100, due to the rotating force of the front blade contact roller 450 and the force of the support unit 350 to support the blade 12. At this time, the rear blade contact roller 480 and the eighth gear 470 are rotated in the counterclockwise direction, due to the force generated by the extended blade 12. Further, the seventh gear 460 engaging with the eighth gear 470 is rotated in the clockwise direction. The tape measure constructed in this way allows the blade 12 to be extended from the housing 100, regardless of the moving direction of the housing 100, that is, the rotating direction of the ground contact roller 300, so that it is convenient to use.

The tape measure of this invention constructed as described above is operated as follows. Referring to FIGS. 2 and 3, a user holds the handle 110 of the tape measure in one hand, and causes a portion of the ground contact roller 300, exposed to the outside of the housing 100, to come into contact with a flat exterior surface. Next, the housing 100 is pushed forwards. At this time, the ground contact roller 300 is rotated in the counterclockwise direction. Further, the support unit 350 contacting the upper surface of the blade 12 is rotated in the clockwise direction. Thus, the blade 12 is automatically extended from the housing 100 through the slot 13, due to the rotating force of the ground contact roller 300 and the force of the support unit 350 to support the blade 12.

At this time, the stopper 180 of the blade locking unit, which is provided in the housing 100, comes into close contact with the surface of the blade 12, thus automatically locking the extended blade 12. In such a state, a user can measure the length or the like of a desired object, using the blade 12 extended from the housing 100.

After the length of the object has been measured, the user presses the locking lever 140 which protrudes from the upper end of the housing 100. At this time, the stopper 180 is released from the surface of the extended blade 12, so that the blade 12 is automatically taken up. In this case, the ground contact roller 300 is in contact with the underside of the blade 12 and supports the blade 12. Thus, when the blade 12 is lengthily extended from the housing 100 and is rewound in the housing 100, the ground contact roller 300 prevents the blade 12 from sagging, thus preventing the blade 12 from being in contact with the lower edge of the slot 13. The blade 12 contacts the ground contact roller 300, thus generating rolling frictional force. Therefore, the blade 12 is smoothly extended from the housing 100 and rewound into the housing 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, a tape measure with an automatic blade extension mechanism, according to the present invention, has the following effects.

When a user desires to measure the dimension of an object, it is possible to draw and lock a blade using only one hand, thus allowing the other hand to be freely used in a workplace where several works must be carried out, therefore allowing the user to simultaneously perform cutting work, hammering work, marking work, etc. during the measuring operation. Thereby, the tape measure of this invention is convenient to use, in addition to increasing work efficiency. Further, since it is possible to extend the blade with one hand, the other hand can be freely used while working at a high location, thus ensuring the safety of the user, and allowing the operation to be efficiently carried out in a narrow space where it is difficult to use both hands.

What is claimed is:

1. A tape measure comprising:
   a housing having a slot on a lower end of a surface thereof;
   a bobbin rotatably installed in the housing;
   a blade wound around the bobbin in a coil and extended out through the slot;
   a ground contact roller rotatably provided under the blade at a position between the slot and the bobbin in a lower portion of the housing to be in contact with a flat exterior surface, wherein the ground contact roller is rolled on the flat exterior surface so as to rotate, and the blade is extended from the housing due to the rotation of the ground contact roller;
   a blade locking unit to lock the blade extended from the housing; and
   a support unit provided above the blade at a position between the slot and the bobbin to support the blade against the ground contact roller, wherein the support unit is a roller in contact with the blade and is capable of rolling by the movement of the blade.

2. The tape measure as set forth in claim 1, further comprising:
   a first power transmission unit provided between the ground contact roller and the blade, and transmitting a rotating force from the ground contact roller to the blade.

* * * * *